United States Patent Office 2,945,899
Patented July 19, 1960

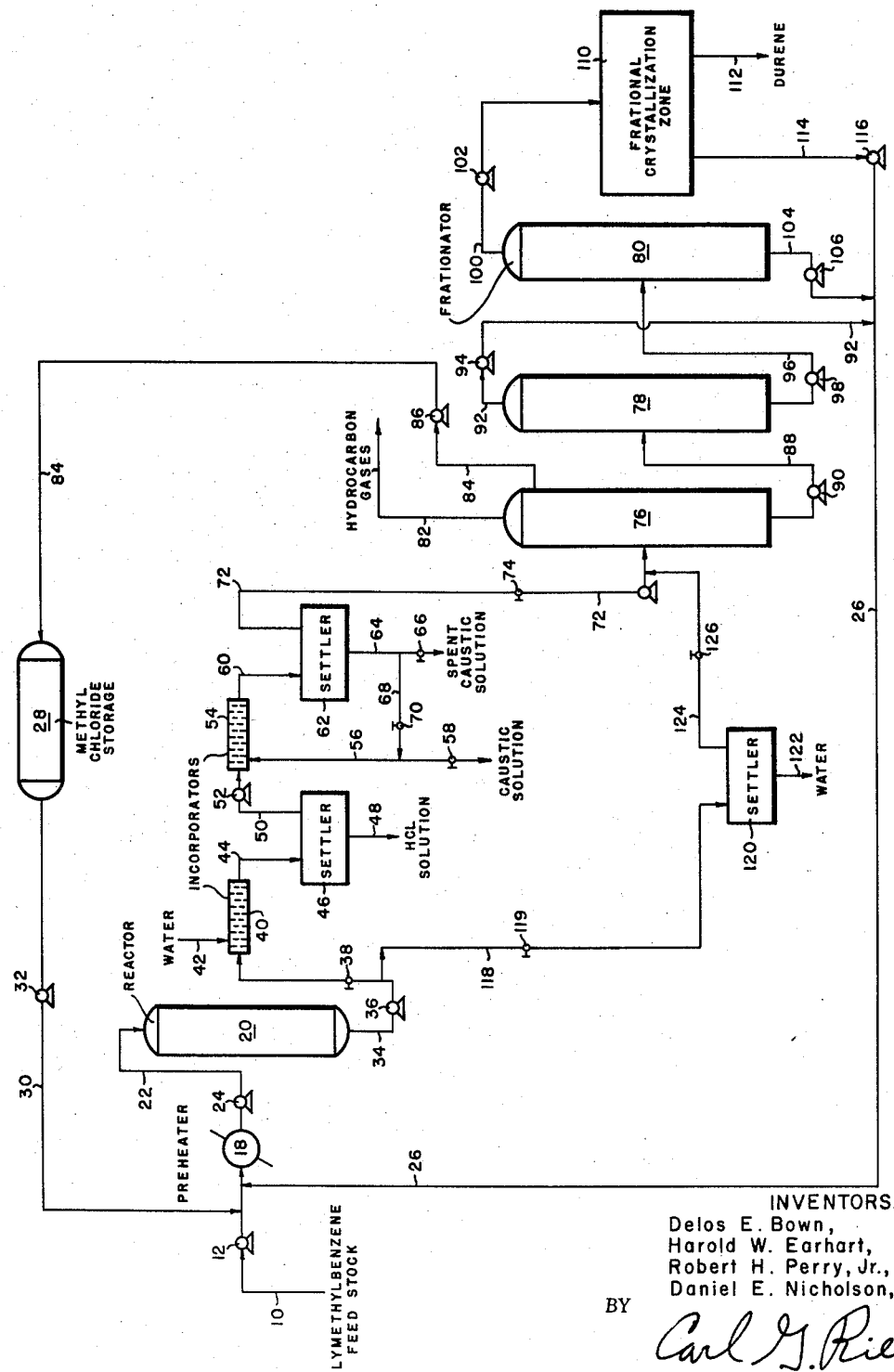

2,945,899

POLYMETHYLBENZENE TREATING PROCESS

Delos E. Bown, Baytown, Harold W. Earhart, Houston, and Robert H. Perry, Jr., and Daniel E. Nicholson, Baytown, Tex., assignors, by mesne assignments, to Esso Research and Engineering Company, Elizabeth, N.J., a corporation of Delaware Filed Mar. 25, 1957, Ser. No. 648,353

8 Claims. (Cl. 260—668)

This invention relates to a process for treatment of polymethylbenzene hydrocarbons for the production of durene. More particularly, the present invention relates to a process for the preparation and recovery of durene from polymethylbenzene feed stocks containing an average of about 8.5 to about 9.5 carbon atoms per molecule.

It has been discovered in accordance with the present invention that when a polymethylbenzezne feed stock containing an average of from about 8.5 to 9.5 carbon atoms per molecule is reacted with about 1 mol of a methylating agent per mol of feed stock in the vapor phase in the presence of a silica-alumina alkylation catalyst at a temperature within the range of about 650° to 950° F. at a liquid flow rate of about 0.2 to 1 v./v./hr. there is formed a polymethylbenzene product containing an enhanced amount of durene.

During the course of the treatment, a wide variety of reactions take place, including methylation reactions, disproportionation reactions, and transmethylation reactions.

A feature of the present invention is the discovery that under the aforesaid reaction conditions a transmethylation type series of reactions occurs which have the net effect of converting trimethylbenzenes and hexamethylbenzene to dimethylbenzenes and tetramethylbenzenes.

A particularly desirable feature of the present invention is that the products from the aforesaid reactions exist in an equilibrium state such that the reaction product contains a minimized amount of benzene, toluene, pentamethylbenzene, and hexamethylbenzene, whereby it is possible to recycle such components to the reaction zone without undesirable effects in that such components tend to be converted to $C_8$ to $C_{10}$ polymethylbenzenes. As a consequence, the process of the present invention is particularly adaptable to continuous operations wherein durene is recovered from the polymethylbenzene reaction products after which all of the polymethylbenzene by-products are recycled to the conversion zone whereby on a continuous basis substantially all of the initial polymethylbenzene feed stock is converted to durene.

Catalysts to be employed in accordance with the present invention are silica-alumina catalysts which preferably contain from about 5 to 25 weight percent of alumina. Although the surface area of the catalyst may be varied within wide limits, it has been discovered in accordance with the present invention that unexpectedly superior yields of durene are obtainable when the surface area of the catalyst is within the range of about 100 to 200 m.²/gm.

The feed stock of the present invention should be a polymethylbenzene feed stock which is preferably substantially completely free from olefinic components and which contains an average of from about 8.5 to 9.5 carbon atoms per molecule. Thus, the feed stock to the reaction zone may comprise a mixture of $C_7$ to $C_{12}$ polymethylbenzene components, such components being proportioned in a manner such that there is an average of 8.5 to 9.5 carbon atoms per molecule of feed stock. Preferably, the feed stock comprises a mixture of recycled polymethylbenzene by-products with a fresh polymethylbenzene feed stock of a composition such that the mixture of fresh feed with recycled by-products will have the desired average of about 8.5 to 9.5 carbon atoms per molecule. A particularly desirable feed mixture is a mixture of a trimethylbenzene such as pseudocumene with recycled polymethylbenzene by-products.

A methylation agent is employed in accordance with the present invention in the ratio of about 1 mol of methylation agent per mol of feed stock. Among the methylating agents that may be used with good results are compounds such as methyl chloride, methyl alcohol and dimethyl ether.

The methylating agent and feed stock are brought into contact with the silica alumina catalyst in vapor phase at a temperature within the range of about 650° to 950° F. at a velocity, computed on the basis of liquid flow rate, of from about 0.2 to about 1 v./v./hr. In general, methyl chloride is the preferred methylating agent at temperatures of from about 650° to about 750° F. in that the best yield of durene is obtained with methyl chloride within this temperature range. At temperatures intermediate about 750° to 950° F. the durene yield is enhanced through the use of an oxygen-containing methylating agent such as methyl alcohol or dimethyl ether.

It is desirable to correlate reaction temperature with flow rate, flow rate being increased as temperature is increased. Thus, at temperatures of about 650° to 750° F., it is preferable to employ a liquid flow rate of about 0.2 to about 0.5 volume of feed per volume of catalyst per hour. At temperatures intermediate 750° to 950° F. it is preferable to employ a flow rate of about 0.5 to 1.0 volume of feed per volume of catalyst per hour.

The reaction is preferably conducted at atmospheric pressure but, if desired, higher pressures of up to about 500 p.s.i.g. may be employed.

In conducting the process of the present invention in a continuous manner, a mixture of a suitable feed stock and methylating agent as described above is charged to a conversion zone containing a silica-alumina catalyst under the recited conversion conditions and the product from this reaction is fractionated into normally gaseous hydrocarbon components which are discarded and a polymethylbenzene fraction. The polymethylbenzene fraction is treated in any suitable manner such as by a combination distillation and fractional crystallization process to be described subsequently to recover durene as a product after which the remainder of the polymethylbenzenes are recycled to the conversion zone.

A preferred manner in which the process of the present invention may be practiced in a continuous manner is diagrammatically disclosed in the single figure of the attached drawing, such showing being given by way of illustration and not being intended as a limitation on the scope of this invention.

Turning now to the drawing, there is disclosed a charge line 10 containing a pump 12 leading to a preheater 18. The preheater 18 is connected with a reactor 20 containing a bed of silica-alumina catalyst by way of a line 22 containing a pump 24. A suitable polymethylbenzene feed stock such as, for example, pseudocumene, is delivered to the line 10 from a suitable source (not shown). A recycle material obtained in a manner to be described is added to the feed stock by way of a recycle line 26 to form a polymethylbenzene feed mixture to which is added about 1 mol of a methylating agent per mol of feed stock mixture, the methylating agent being charged to the line 10 from a storage tank 28 by way of a line 30 containing a pump 32.

The resultant mixture is passed by the line 10 to the preheater 18 wherein the feed mixture is brought to a reaction temperature within the range of about 650° to about 950° F.

The vaporized feed components are then passed by way of the line 22 to the reactor 20 at a liquid flow rate within the range of about 0.2 to about 1.0 volume of feed mixture per volume of catalyst per hour.

Within the reactor 20 at least a portion of the methylating agent reacts with polymethylbenzene feed mixture components to form methylation products and, in addition, disproportionation and transmethylation reactions also occur whereby a product is formed containing a wide variety of polymethylbenzenes, a small amount of normally gaseous hydrocarbons and whereby carbonaceous deposits are also laid down on the bed of catalysts. The catalysts may be periodically regenerated as desired by controlled combustion of the carbonaceous deposits by any of the suitable regeneration techniques known to those skilled in the art.

In the case where the methylating agent is methyl chloride the reaction products are discharged from reactor 20 by way of a line 34 containing a pump 36 and controlled by a valve 38 leading to an incorporator 40 of any suitable construction such as a baffled type incorporator. Within the incorporator 40 the reaction products are intimately mixed with a suitable wash liquid, such as water introduced by way of a line 42. The thus-formed mixture is discharged from the incorporator 40 by way of a line 44 leading to a settler 46 wherein the water and dissolved hydrochloric acid by-product separate from the reaction products for discharge by way of the line 48. The water washed product is withdrawn from the settler 46 by way of a line 50 containing a pump 52 leading to a second incorporator 54 of any suitable construction such as a baffled type incorporator, wherein the water washed product is mixed with an alkaline wash solution such as an aqueous solution of sodium hydroxide introduced thereto by way of a charge line 56 controlled by a valve 58. The purpose of the caustic wash step is to remove trace amounts of hydrogen chloride and other acidic contaminants which may be present in the reaction products. The thus-formed mixture is discharged from incorporator 54 by way of a line 60 leading to a settler 62 wherein phase separation occurs, the spent alkali solution collecting as a liquid phase and being withdrawn from the settler 62 by way of a discharge line 64 controlled by a valve 66. If desired, all or a part of the spent caustic solution may be recycled to the charge line 56 leading to the incorporator 54 by way of a recycle line 68 controlled by a valve 70.

The treated reaction products are withdrawn from the settler 62 by way of a line 72 controlled by a valve 74 leading to a separation zone comprising suitable means such as a plurality of fractionators 76, 78 and 80 for fractionating the reaction product into desired fractions.

For example, the reaction product fed to the fractionator 76 by way of the line 72 may be split into a gaseous hydrocarbon fraction taken overhead from the fractionator 76 by way of a line 82 for discard and a side stream fraction consisting essentially of methyl chloride discharged by way of a branch line 84 containing a pump 86 leading to the methyl chloride storage tank 28.

A bottoms fraction consisting essentially of polymethylbenzenes is discharged from the fractionator 76 by way of a bottoms line 88 containing a pump 90 leading to the fractionator 78. Within the fractionator 78 the polymethylbenzenes are split to form an overheads fraction discharged by way of a line 92 containing a pump 94 leading to the recycle line 26, the overhead fraction 92 consisting primarily of polymethylbenzenes containing less than 10 carbon atoms.

A polymethylbenzene fraction containing $C_{10}$ and heavier polymethylbenzenes is discharged from the fractionator 78 by way of a line 96 containing a pump 98 leading to the fractionator 80 wherein an overhead fraction consisting essentially of tetramethylbenzenes is obtained as an overhead fraction discharged by way of the line 100 containing a pump 102. A bottoms fraction containing reaction components of more than 10 carbon atoms is discharged from the fractionator 80 by way of a bottoms discharge line 104 containing a pump 106 which also leads to the recycle line 26.

The tetramethylbenzene fraction taken overhead from the fractionator 80 is charged to a suitable durene recovery zone such as a fractional crystallization zone 110 wherein substantially pure durene is recovered. Purified durene is discharged from the fractional crystallization zone by a line 112 as product and the remainder of the tetramethylbenzene fraction is discharged from the fractional crystallization zone 110 by a discharge line 114 containing a pump 116 leading to the said recycle line 26.

It will be understood, of course, that if desired other valuable polymethylbenzenes such as paraxylene, mesitylene, etc., may also be recovered from the products of the reaction prior to the recycle of the undesired polymethylbenzene components by way of the line 26 to the charge line 10.

In the situation wherein the methylating agent is an oxygen-containing methylating agent, such as methyl alcohol or dimethyl ether, the principal by-product is water, the reaction product being substantially free from corrosive reactive by-products as is the case where methyl chloride is employed. In this situation, therefore, the valve 38 in discharge line 34 from reactor 20 may be closed and the valve 74 in the charge line 72 for the fractionator 76 may be closed whereby the settlers 46 and 62 are bypassed. In this situation, the effluent from the reactor 20 passes from the discharge line 34 to a branch line 118 controlled by a valve 119 to settler 120. The water in the reactor effluent is condensed and separated from the remainder of the products in the settler 120 and discharged therefrom by a line 122. The remainder of the products are discharged from the settler 120 by way of a line 124 controlled by a valve 126 leading to the charge line 72 for the fractionator 76. The effluent is thereafter processed in the described manner.

As a specific example, a suitable feed stock such as, for example, pseudocumene may be continuously processed for substantially complete conversion to durene. For example, 100 barrels per day of pseudocumene of 95% purity may be introduced into the charge line 10 for conversion to durene. The pseudocumene may be mixed with recycled polymethylbenzenes and about 1 mol of methyl chloride per mol of said mixture to form a total charge of about 783 barrels per day of feed mixture charged to the reactor 20 by way of drier 14 and the preheater 18. About 775 barrels per day of liquid products plus hydrogen chloride, gaseous hydrocarbons and methyl chloride are discharged from the reactor 20 by way of the line 34 as effluent. The effluent is water washed in the incorporator 40 and the wash product is withdrawn from the settler 46 for treatment with a suitable alkali in the line 50, the treated effluent being discharged from the settler 62 by way of the line 72 leading to the fractionator 76. Unreacted methyl chloride (normally amounting to about 50 volume percent of the methyl chloride charged) is discharged from the fractionator 76 by way of the branch line 84 for return to the methyl chloride storage tank 28. As indicated, about 775 barrels per day of polymethylbenzenes are taken as a bottoms fraction from the fractionator 76 by way of the line 88. The polymethylbenzenes are split in the fractionator 78 into a bottoms fraction of polymethylzenzenes containing at least 10 carbon atoms per molecule at the rate of about 385 barrels per day. An overhead fraction consisting of $C_9$ polymethylbenzenes and lighter polymethylbenzenes at the rate of about 389 barrels per day is taken overhead by way of the line 92 and charged to the recycle line 26. The bottoms fraction 96 from the fractionator 78 is split in the fractionator 80 into about 250 barrels per day of tetramethylbenzenes taken overhead by way of the line 100 and about 136 barrels per day of penta- and hexamethyl benzenes discharged by the line 104 leading to the recycle line 26.

The tetramethylbenzenes are charged by way of the line 100 to the fractional crystallization zone 110 wherein about 92 barrels per day of durene of about 95% purity are obtained, about 157 barrels per day of tetramethylbenzenes being charged to the recycle line 26 by way of the discharge line 114 of the fractional crystallization zone 110.

From this specific example it is seen that about 92% of the pseudocumene initially charged to the unit is converted to durene and that only about 8% is lost from the process in the form of by-products.

The present invention will be further illustrated by the following specific examples which are given by way of illustration and which are not intended as limitations on the scope of the invention.

EXAMPLE I

Two samples consisting of pseudocumene of 95% purity were treated, the first sample being treated with a silica alumina catalyst in the presence of methyl chloride and the other sample being treated with the silica alumina catalyst in the presence of methyl alcohol. The specific catalyst utilized for the runs was a catalyst consisting of about 87% silica and about 13 weight percent of alumina which had been steamed for 12 hours at a pressure of 60 p.s.i.g. and a temperature of about 1100° F. to form a catalyst having a surface area of about 122 m.$^2$/gm. The reaction conditions employed and the results obtained are set forth in the following table.

*Table I*

| Feed Stock | Pseudocumene | |
|---|---|---|
| Methylating Agent | CH$_3$Cl | CH$_3$OH |
| Mol Ratio of Feed Stock to Methylating Agent | 1/1 | 1/1 |
| Temperature, °F | 700 | 900 |
| Space Velocity, v./v./hr | 0.39 | 0.67 |
| Product Composition: | | |
| Benzene | 0.0 | 0.0 |
| Toluene | 0.2 | 0.2 |
| Xylenes | 5.0 | 2.7 |
| Trimethylbenzenes | 51.2 | 56.4 |
| Tetramethylbenzenes | 26.0 | 26.3 |
| Pentamethylbenzene | 13.6 | 10.2 |
| Hexamethylbenzene | 4.0 | 4.0 |
| Total | 100.0 | 99.8 |
| Fraction of Methylating Agent Converted to Methylbenzenes percent | 50 | 48 |
| Conversion to Liquid Product do | 95 | 97.5 |
| Amount of Durene in Tetramethylbenzene Fraction percent | 33 | 35 |

From Table I it will be seen that in each instance a substantial yield of teteramethylbenzenes was obtained, about one-third of the tetramethylbenzene fraction consisting of durene. It is to be observed that the primary products of the reaction were trimethylbenzenes, tetramethylbenzenes and pentamethylbenzene, and that only a very negligible amount of xylenes and hexamethylbenzene were formed.

It is to be further observed that there was a substantially complete conversion of the pseudocumene to liquid products, a 95% conversion being obtained with methyl chloride and a 97.5% conversion being obtained with methyl alcohol.

It is a characteristic of the present invention that not all of the methylating agent is reacted with the polymethylbenzene feed stock as is shown by the fact that there was only about a 50 volume percent conversion with respect to the methyl chloride run and a 48 volume percent conversion with respect to the methyl alcohol run.

EXAMPLE II

As has been indicated, it is preferable to employ silica-alumina catalysts having a surface area of from about 100 to 200 m.$^2$/gm. This is shown by the results of the following experiments wherein four samples of pseudocumene were treated under the conditions set forth in Table II with the results that are likewise there set forth.

The catalyst utilized for the experiments summarized in Table II was the same catalyst as employed in Example I except that in this case the catalyst was a fresh silica-alumina catalyst which had not been steam deactivated and which had a surface area of about 577 m$^2$/gm.

*Table II*

| Feed Stock | Pseudocumene | | | |
|---|---|---|---|---|
| Run. No | 1 | 2 | 3 | 4 |
| Methylating Agent | CH$_3$Cl | CH$_3$OH | CH$_3$OH | CH$_3$OH |
| Mol Ratio of Feed Stock to Methylating Agent | 1/1 | 1/1 | 1/1 | 1/1 |
| Temperature, °F | 700 | 900 | 900 | 700 |
| Space Velocity, v./v./hr | 0.39 | 0.67 | 0.33 | 0.33 |
| Product Composition: | | | | |
| Benzene | 0.0 | 0.0 | 0.0 | 0.0 |
| Toluene | 0.0 | 0.3 | 0.9 | 0.0 |
| Xylenes | 2.2 | 3.8 | 12.6 | 1.1 |
| Trimethylbenzenes | 70.6 | 66.1 | 54.0 | 76.7 |
| Tetramethylbenzenes | 18.9 | 22.4 | 28.2 | 15.7 |
| Pentamethylbenzene | 6.2 | 5.9 | 3.6 | 4.1 |
| Hexamethylbenzene | 2.0 | 1.3 | 0.2 | 3.4 |
| Total | 99.9 | 99.8 | 99.5 | 101.0 |
| Fraction of Methylating Agent Converted to Methylbenzenes percent | 20 | 27 | 15 | 26 |
| Conversion to Liquid Product percent | 91 | 88 | 88 | 96 |
| Amount of Durene in Tetramethylbenzene Fraction percent | 33 | 35 | 35 | 33 |

When the results of runs 1 and 2 of Table II are compared with the results of Table I, it will be observed that there was a substantial diminution of yield when a high surface area catalyst was employed as in Example II. Thus, with methyl chloride it will be observed that the yield of teteramethylbenzenes was only about 19% as contrasted with the 26% yield in the case of Example I. It is further to be noted that the conversion of methyl chloride to polymethylbenzenes was substantially less in the case of Experiment II and that the yield of liquid products was substantially lessened both with respect to the methyl chloride run and with respect to the methyl alcohol run.

Runs 3 and 4 of Table II are demonstrative of the influence of temperature and flow rate on reaction product compositions and conversion. Thus, in the case of run No. 3 pseudocumene was treated with methyl alcohol at 900° F. and a flow rate of about 0.3 v./v./hr. (approximately twice as long a contact time as in the case of run No. 2). It will be observed that the slightly increased yield of tetramethylbenzenes was more than offset by the increase in xylenes formation. In run No. 4 wherein the methyl alcohol was reacted with pseudocumene at a temperature of 700° F. and a flow rate of 0.33 v./v.hr. (essentially the reaction conditions of run No. 1) there was a substantial diminution in the yield of tetramethylbenzenes as compared with the results obtained in run No. 2.

EXAMPLE III

As further examples of the process of the present invention, samples of pseudocumene of 95% purity were treated with methyl alcohol and dimethyl ether in the presence of a catalyst consisting of about 87 weight percent of silica and 13 weight percent of alumina, such catalyst having a surface area of about 200 m$^2$./gm. Reaction conditions employed and the results obtained are set forth in Table III.

Table III

VAPOR PHASE SYNTHESIS OF DURENE—METHYLATION STUDIES WITH METHYL ALCOHOL AND DIMETHYL ETHER

| Experiment Number | 36 | 37 | 38 |
|---|---|---|---|
| Mol Ratio Methylating Agent to Pseudocumene | 1/1 | 1/1 | 1/1 |
| Reactor Temperature °F | 700 | 900 | 900 |
| Liquid Flow Rate, v./v./hr | 0.30 | 0.30 | 0.30 |
| Methylating Substance | $CH_3OH$ | $CH_3OH$ | $(CH_3)_2O$ |
| Product Composition, Wt., Percent: | | | |
| Toluene | 0.4 | 1.4 | 1.3 |
| p-Xylene | 0.9 | 3.6 | 2.2 |
| m-Xylene | 2.5 | 16.1 | 5.0 |
| o-Xylene | 1.5 | 4.2 | 2.7 |
| Total $C_8$ Aromatics | 4.9 | 23.9 | 9.9 |
| Pseudocumene | 33.4 | 23.7 | 31.4 |
| Mesitylene | 7.0 | 11.2 | 10.4 |
| Hemimellitene | 2.9 | 2.6 | 4.7 |
| Total $C_9$ Aromatics | 43.3 | 37.5 | 46.5 |
| Durene | 14.2 | 11.7 | 12.9 |
| Isodurene | 17.2 | 14.7 | 15.4 |
| Prehnitene | 6.5 | 7.5 | 3.3 |
| Total $C_{10}$ Aromatics | 37.9 | 33.9 | 31.6 |
| Pentamethylbenzene | 9.3 | 3.0 | 5.4 |
| Hexamethylbenzene | 4.2 | 0.8 | 4.8 |

From Table III it will be observed that in each instance there was a substantial conversion of pseudocumene, from about 12 to 14 percent of the polymethylbenzene product consisting of durene.

EXAMPLE IV

As has been indicated, a feature of the present invention is the discovery that under the reaction conditions employed in accordance with the present invention substantial transmethylation of hexa- and pentamethylbenzenes with trimethylbenzenes takes place with the resultant formation of substantial quantities of tetramethylbenzenes and appreciably smaller quantities of xylenes. This is shown by the results obtained when a feed stock having the composition set forth in Table IV was treated in the absence of charged methylating agent at a temperature of about 700° F. and a liquid flow rate of about 0.39 v./v./hr. with the catalyst described in Example I.

Table IV

| Temperature °F | 700 |
|---|---|
| Flow rate, v./v./hr | 0.39 |

| Composition | Feed Stock | Product |
|---|---|---|
| Benzene | 0.0 | 0.0 |
| Toluene | 0.0 | 0.4 |
| Xylenes | 3.2 | 5.0 |
| Trimethylbenzenes | 61.0 | 51.6 |
| Tetramethylbenzenes | 25.5 | 33.4 |
| Pentamethylbenzene | 6.6 | 8.0 |
| Hexamethylbenzene | 3.6 | 1.6 |

From Table IV it will be seen that there was a significant reduction in trimethylbenzene and hexamethylbenzene content when the feed stock is compared to the product, the net effect being to substantially increase the tetramethylbenzene content of the product.

Having described our invention, what is claimed is:

1. A process which comprises treating a polymethylbenzene feed stock containing an average of from about 8.5 to 9.5 carbon atoms per molecule in a combination methylation, disproportionation and transmethylation reaction zone with about 1 mol of a methylating agent per mol of feed stock in vapor phase at about atmospheric pressure in the presence of a silica-alumina alkylation catalyst at a temperature within the range of about 650° to 950° F. at a liquid flow rate of about 0.2 to 1 v./v./hr. and recovering durene from the products of said reaction.

2. A process as in claim 1 wherein the methylating agent is methyl chloride and wherein the treating conditions include a temperature within the range of about 650° to 750° F. and a liquid flow rate within the range of about 0.2 to about 0.5 v./v./hr.

3. A method as in claim 1 wherein the methylating agent is methyl alcohol and wherein the treating conditions include a temperature of about 750° to 950° F. and a liquid flow rate within the rate of about 0.5 to about 1 v./v./hr.

4. A method as in claim 1 wherein the methylating agent is dimethyl ether and wherein the treating conditions include a temperature of about 750° to 950° F. and a liquid flow rate within the rate of about 0.5 to about 1 v./v./hr.

5. A method which comprises the steps of continuously charging to a conversion zone containing a silica-alumina catalyst a vaporized mixture of polymethylbenzene feed stock containing an average of from about 8.5 to 9.5 carbon atoms per molecule in a combination methylation, disproportionation and transmethylation reaction zone with about 1 mol of methylating agent per mol of feed stock at a temperature within the range of about 650° to about 950° F. at a liquid flow rate within the range of about 0.2 to about 1 v./v./hr., and about atmospheric pressure withdrawing the products of said reaction from said conversion zone and separating said products into a gaseous hydrocarbon fraction, a methylation agent fraction, and a polymethylbenzene fraction, recovering durene from said polymethylbenzene fraction and continuously directly recylcing the remainder of said polymethylbenzene fraction to said conversion zone as at least a portion of said feed stock.

6. A process for the preparation of durene which comprises charging a mixture of pseudocumene and a polymethylbenzene recycle fraction to a combination methylation, disporportionation and transmethylation reaction zone conversion zone containing a bed of silica-alumina catalyst having a surface area within the range of about 100 to 200 m.²/gm. in vapor phase in admixture with about 1 mol of methyl chloride per mol of feed mixture at a temperature within the range of about 650° to 750° F. at a flow rate of about 0.2 to 0.05 v./v./hr. and about atmospheric pressure, continuously washing the product of said reaction with water to remove by-product hydrogen chloride, continuously neutralizing the water washed product with an aqeous alkaline solution, next continuously fractionating said product to obtain a gaseous hydrocarbon product, a methyl chloride product fraction and a polymethylbenzene product fraction, continuously fractionating said polymethylbenzene fraction in a fractionation zone into a first fraction consisting of polymethylbenzenes containing less than 10 carbon atoms, a second fraction consisting essentially of tetramethylbenzenes and a third fraction consisting essentially of polymethylbenzenes containing more than about 10 carbon atoms per molecule, continuously treating said second fraction to obtain a high purity durene product and a fourth fraction containing a reduced amount of durene and continuously directly recycling said first, third and fourth fractions to said conversion zone as said recycle fraction.

7. A process for the preparation of durene which comprises charging a mixture of pseudocumene and a polymethylbenzene fraction to a combination methylation, disproportionation and transmethylation reaction zone conversion zone containing a bed of silica alumina catalyst having a surface area within the range of about 100 to 200 m.²/gm. in vapor phase in admixture with about 1 mol of methyl alcohol per mol of feed mixture at a temperature within the range of about 750° to about 950° F. at a flow rate of about 0.5 to 1 v./v./hr. and about atomspheric pressure, continuously separating by-product water from said reaction product, next continuously fractionating said product to obtain a gaseous hydrocarbon fraction, a methyl alcohol product and a polymethylbenzene product fraction, continuously fractionating said polymethylbenzene fraction in a fractionation zone into a first fraction consisting of polymethylbenzene containing less than 10 carbon atoms, a second fraction consisting essentially of tetramethylbenzenes, and a third fraction consisting essentially of polymethylbenzenes containing more than about 10 carbon atoms per molecule, continuously treating said second fraction to obtain a high purity durene product and a fourth fraction containing a reduced amount of durene and continuosuly directly recycling said first, third, and fourth, fractions to said conversion zone as said recycle fraction.

8. A process for the preparation of durene which comprises charging a mixture of pseudocumene and a polymethylbenzene fraction to a combination methylation, disproportionation and transmethylation reaction zone conversion zone containing a bed of silica-alumina catalyst having a surface area within the range of about 100 to 200 m.²/gm. in vapor phase in admixture with about 1 mol of dimethyl ether per mol of feed mixture at a temperature within the range of about 750° to about 950° F. at a flow rate of about 0.5 to 1 v./v./hr. and about atmospheric pressure, continuously separating by-product water from said reaction product, next continuously fractionating said product to obtain a gaseous hydrocarbon product, a product fraction, a dimethyl ether product and a polymethylbenzene product fraction, continuously fractionating said polymethylbenzene fraction in a fractionation zone into a first fraction consisting of polymethylbenzenes containing less than 10 carbon atoms, a second fraction consisting essentially of tetramethylbenzenes, and a third fraction consisting essentially of polymethylbenzenes containing more than about 10 carbon atoms per molecule, continuously treating said second fraction to obtain a high purity durene product and a fourth fraction containing a reduced amount of durene and continuously directly recyling said first, third, and fourth fractions to said conversion zone as said recycle fraction.

References Cited in the file of this patent
UNITED STATES PATENTS

| | | |
|---|---|---|
| 2,443,247 | Howell | June 15, 1948 |
| 2,581,014 | Gorin et al. | Jan. 1, 1952 |
| 2,656,397 | Holzman et al. | Oct. 20, 1953 |
| 2,756,261 | Fetterly | July 24, 1956 |
| 2,818,452 | Mavity | Dec. 31, 1957 |
| 2,837,584 | Hoff | June 3, 1958 |

FOREIGN PATENTS

| | | |
|---|---|---|
| 204,735 | Australia | July 7, 1955 |